US010807669B2

United States Patent
Tabuchi et al.

(10) Patent No.: US 10,807,669 B2
(45) Date of Patent: Oct. 20, 2020

(54) RESIN-MADE FUEL TANK OF SADDLE RIDING VEHICLE

(71) Applicant: HONDA MOTOR CO., LTD., Tokyo (JP)

(72) Inventors: Daisuke Tabuchi, Wako (JP); Ko Kurata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 16/155,988

(22) Filed: Oct. 10, 2018

(65) Prior Publication Data
US 2019/0127007 A1    May 2, 2019

(30) Foreign Application Priority Data
Oct. 31, 2017   (JP) .................................. 2017-211353

(51) Int. Cl.
*B62J 35/00* (2006.01)
*B29L 31/00* (2006.01)
*B29K 23/00* (2006.01)
*B29C 45/16* (2006.01)

(52) U.S. Cl.
CPC .............. *B62J 35/00* (2013.01); *B29C 45/16* (2013.01); *B29K 2023/065* (2013.01); *B29K 2023/086* (2013.01); *B29K 2995/0069* (2013.01); *B29L 2031/7172* (2013.01); *B62K 2202/00* (2013.01)

(58) Field of Classification Search
CPC .. B62J 35/00; B65D 25/04; B29L 2031/7172; B60K 15/035
See application file for complete search history.

(56) References Cited

U.S. PATENT DOCUMENTS

2011/0083771 A1   4/2011   Whelan et al.
2016/0059477 A1   3/2016   Karsch

FOREIGN PATENT DOCUMENTS

| JP | S56-67678 | 6/1981 |
| JP | H11-240344 | 9/1999 |
| JP | 2010-188758 | 9/2010 |
| JP | 2010-280317 | 12/2010 |
| JP | 5389537 | 10/2013 |
| JP | 2015-174600 | 10/2015 |

OTHER PUBLICATIONS

Japanese Office Action dated May 7, 2019, English translation included, 9 pages.
Japanese Office Action dated Dec. 3, 2019, English translation included, 12 pages.
Japanese Office Action dated Jun. 23, 2020, English translation included, 9 pages.
Indian Office Action dated Jul. 19, 2020, 6 pages (Includes English Text).

*Primary Examiner* — Stephen J Castellano
(74) *Attorney, Agent, or Firm* — Rankin, Hill & Clark LLP

(57) ABSTRACT

In a resin-made fuel tank of a motorcycle as a saddle riding vehicle where a tank wall is formed of: a resin-made tank body; and a barrier layer formed on an inner surface of the tank body at the time of forming the tank body by injection molding, the barrier layer provided for suppressing permeation of fuel, wherein a semi-cylindrical recessed portion indented toward the inward of the tank is integrally formed with the tank wall, and an activated carbon storing portion of a canister is formed by covering a space which includes the semi-cylindrical recessed portion with a lid member.

15 Claims, 12 Drawing Sheets

RESIN-MADE FUEL TANK OF SADDLE RIDING VEHICLE

The present application claims priority under 35 U.S.C. § 119 to Japanese Patent Application No. 2017-211353 filed on Oct. 31, 2017. The content of the applications is incorporated herein by reference in its entirety.

TECHNICAL FIELD

The present invention relates to a resin-made fuel tank of a saddle riding vehicle.

BACKGROUND ART

Conventionally, there has been known a fuel tank which includes a barrier layer formed using a material having smaller permeability of fuel than a material for forming a tank body (see Patent Literature 1, for example).

The fuel tank also includes a canister. The canister is formed by integrally forming a recessed container on an upper wall of the fuel tank and by closing an upper opening of the container by a planar lid member.

CITATION LIST

Patent Literature

[Patent Literature 1] Japanese Patent No. 5389537

SUMMARY OF INVENTION

Technical Problem

In Patent Literature 1, the barrier layer is not provided in the recessed container formed on the upper wall. However, assuming a case where the barrier layer is provided in the recessed container, when a corner portion is formed on the container, there is a concern that the barrier layer is bent at the corner portion so that a wrinkle is generated in the barrier layer or a stress is concentrated on the barrier layer. Further, a volume of the container per se is increased and hence, a capacity of the fuel tank is decreased. Accordingly, there has been a demand for suppressing the decrease of the capacity.

It is an object of the present invention to provide a resin-made fuel tank of a saddle riding vehicle where the decrease of a capacity of a fuel tank can be suppressed without affecting a barrier layer.

Solution to Problem

To overcome the above-mentioned drawbacks, an aspect of the present invention provides a resin-made fuel tank of a saddle riding vehicle where a tank wall (33, 93) is formed of: a resin-made tank body (31, 91); and a barrier layer (32, 92) formed on an inner surface of the tank body (31, 91) at the time of forming the tank body (31, 91) by injection molding, the barrier layer (32, 92) being provided for suppressing permeation of fuel. In the resin-made fuel tank of the saddle riding vehicle, a recessed portion (16g, 86g) indented toward the inward of the tank is integrally formed with the tank wall (33, 93), and an adsorbent storing portion (14S, 84S) of the canister (14, 84) is formed by covering a space which includes the recessed portion (16g, 86g) with a lid member (34, 94).

In the above-mentioned invention, the barrier layer (32, 92) may be a shaped body which is preliminarily shaped into a tank shape, the barrier layer (32, 92) may be formed substantially along the tank external form, and the recessed portion (16g, 86g) may be formed on the tank body (31, 91) side.

In the above-mentioned invention, a peripheral portion (86h) of the recessed portion (86g) of the tank wall (93) may be connected to the tank wall (93) around the peripheral portion (86h) in a curved shape.

In the above-mentioned invention, the lid member (94) may be formed as a separate part from the tank body (91), and the lid member (94) may be bonded to the peripheral portion (86h) of the recessed portion (86g).

In the above-mentioned invention, the recessed portion (86g) may include the barrier layer (92).

In the above-mentioned invention, the lid member (94) may protrude from the tank wall (93) toward an outside of the tank.

The present invention also provides a resin-made fuel tank of a saddle riding vehicle where a tank wall (113) is formed of: a resin-made tank body (118); and a barrier layer (119) formed on an inner surface of the tank body (118) at the time of forming the tank body (118) by injection molding, the barrier layer (119) being provided for suppressing permeation of fuel. In the resin-made fuel tank of the saddle riding vehicle, a semicylindrical recessed portion (106g) indented toward the inward of the tank is integrally formed with the tank wall (113), a canister (103) formed as a separate part is detachably disposed in the semicylindrical recessed portion (106g), and the canister (103) formed as a separate part is held on an outer surface of the tank body (118) by a holding unit (102).

Advantageous Effects of Invention

In the aspect of the present invention, the recessed portion indented toward the inward of the tank is integrally formed with the tank wall, and the adsorbent storing portion of the canister is formed by covering the space which includes the recessed portion with the lid member. With such a configuration in which the recessed portion is integrally formed with the tank wall, the generation of a wrinkle and the concentration of a stress on the barrier layer in the recessed portion can be prevented; that is, it is possible to so as not to affect the barrier layer and, the decrease of a capacity of the fuel tank can be suppressed compared to a conventional fuel tank.

In the above-mentioned invention, the barrier layer is a shaped body which is preliminarily shaped into a tank shape, the barrier layer is formed substantially along the tank external form, and the recessed portion is formed on a tank body side. With such a configuration, the recessed portion can be formed in various shapes.

In the above-mentioned invention, the peripheral portion of the recessed portion of the tank wall is connected to the tank wall around the peripheral portion in a curved shape. With such a configuration, the generation of a wrinkle or the concentration of a stress on the barrier layer can be prevented and hence, durability of the barrier layer can be enhanced.

In the above-mentioned invention, the lid member is formed as a separate part from the tank body, and the lid member is bonded to the peripheral portion of the recessed portion. With such a configuration, it is possible to so as not to thermally affect the barrier layer at the time of welding the lid member to the barrier layer and hence, durability of the barrier layer can be enhanced.

In the above-mentioned invention, the recessed portion includes the barrier layer. With such a configuration, it is unnecessary to provide the barrier layer on the lid member and hence, the reduction of a cost can be realized.

In the above-mentioned invention, the lid member protrudes from the tank wall toward an outside of the tank. With such a configuration, the decrease of a capacity of the fuel tank can be suppressed. Further, in the case where the lid member is provided on an upper portion of the tank wall, by protruding a pipe connecting port of the canister sideward from the protruding portion of the lid member, a height of the fuel tank can be suppressed low.

In the present invention, a semicylindrical recessed portion indented toward the inward of the tank is integrally formed with the tank wall, a canister formed as a separate part is detachably disposed in the semicylindrical recessed portion, and the canister formed as a separate part is held on an outer surface of the tank body by a holding unit. With such a configuration, by mounting the canister formed as the separate part on the tank body from the outside, the canister can be mounted or removed and thereby maintenance property can be enhanced.

DESCRIPTION OF EMBODIMENTS

Hereinafter, one embodiment of the present invention is described with reference to drawings. In the description, directions of front and rear, left and right, and up and down are equal to directions of a vehicle body unless otherwise specified. In the respective drawings, symbol FR indicates a front side of the vehicle body, symbol UP indicates an upper side of the vehicle body, and symbol LH indicates a left side of the vehicle body.

First Embodiment

Figure 1:
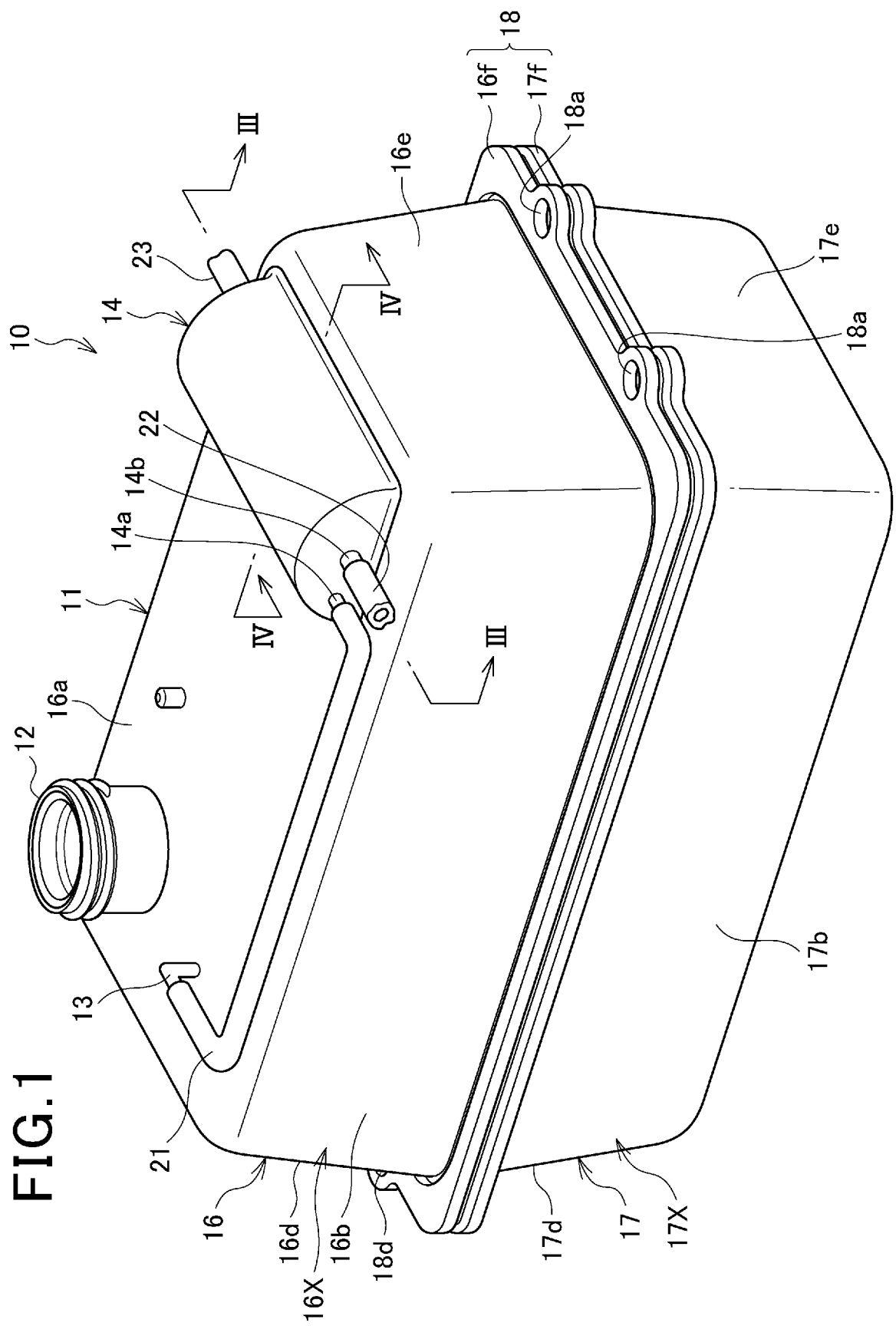
FIG. 1 is a perspective view showing a fuel tank of a first embodiment according to the present invention.

FIG. 1 is a perspective view showing a fuel tank 10 of a first embodiment according to the present invention.

The fuel tank 10 includes: a tank main portion 11 which forms a main portion for storing fuel; a filler opening 12 for filling fuel into the tank main portion 11 therethrough; a discharge port 13 for discharging evaporated fuel in the tank main portion 11 to the outside of the fuel tank 10; and a canister 14 which is integrally provided on an upper portion of the tank.

The tank main portion 11 is formed of a resin-made upper half body 16 and a resin-made lower half body 17.

The upper half body 16 includes: a tank wall 16X; and an upper flange 16f which is integrally formed on an edge portion of the tank wall 16X. The tank wall 16X includes an upper wall 16a, and four side walls 16b, 16c, 16d, 16e.

The above-mentioned filler opening 12, discharge port 13, and canister 14 are provided on the upper wall 16a. The side walls 16b, 16c, 16d, 16e extend downward from a peripheral portion of the upper wall 16a, and both edge portions of the side walls 16b, 16c, 16d, 16e and an edge portion of the upper wall 16a are connected to each other. The upper flange 16f is formed over the four side walls 16b, 16c, 16d, 16e (see FIG. 3 with respect to the side wall 16c).

The lower half body 17 includes: a tank wall 17X; and a lower flange 17f which is integrally formed on an edge portion of the tank wall 17X.

The tank wall 17X includes a bottom wall 17a (see FIG. 3) and four side walls 17b, 17c, 17d, 17e (see FIG. 3 with respect to the side wall 17c) which are raised from a peripheral edge portion of the bottom wall 17a, both edge portions of the four respective side walls 17b, 17c, 17d, 17e are connected to each other. The lower flange 17f is formed over the side walls 17b, 17c, 17d, 17e.

The above-mentioned upper flange 16f and lower flange 17f form a flange 18, and the upper flange 16f and the lower flange 17f are bonded to each other in an overlapping manner in a vertical direction.

A plurality of mounting holes 18a are formed in the flange 18. The flange 18 can be mounted on a vehicle body frame or the like of a vehicle using fastening members formed of bolts which pass through the plurality of mounting holes 18a and nuts or the like.

The filler opening 12 is configured such that a cap (not shown in the drawing) is threadedly engaged with an upper portion of the filler opening 12 so as to close the filler opening 12.

The canister 14 is configured such that evaporated fuel in the fuel tank 10 is temporarily adsorbed by an absorbent (activated carbon), and the adsorbed evaporated fuel is discharged from the activated carbon and is supplied to an intake pipe of an engine of the vehicle (not shown in the drawing) by further taking in fresh air to the canister 14.

A charge port 14a and a purge port 14b are provided on one end portion of the canister 14. The charge port 14a is a portion connected to the discharge port 13 by way of a charge pipe 21 so as to take in evaporated fuel in the fuel tank 10 in the canister 14. The purge port 14b is a portion for discharging evaporated fuel to the outside of the canister 14, and is connected to the intake pipe of the engine by way of a purge pipe 22.

Figure 2:
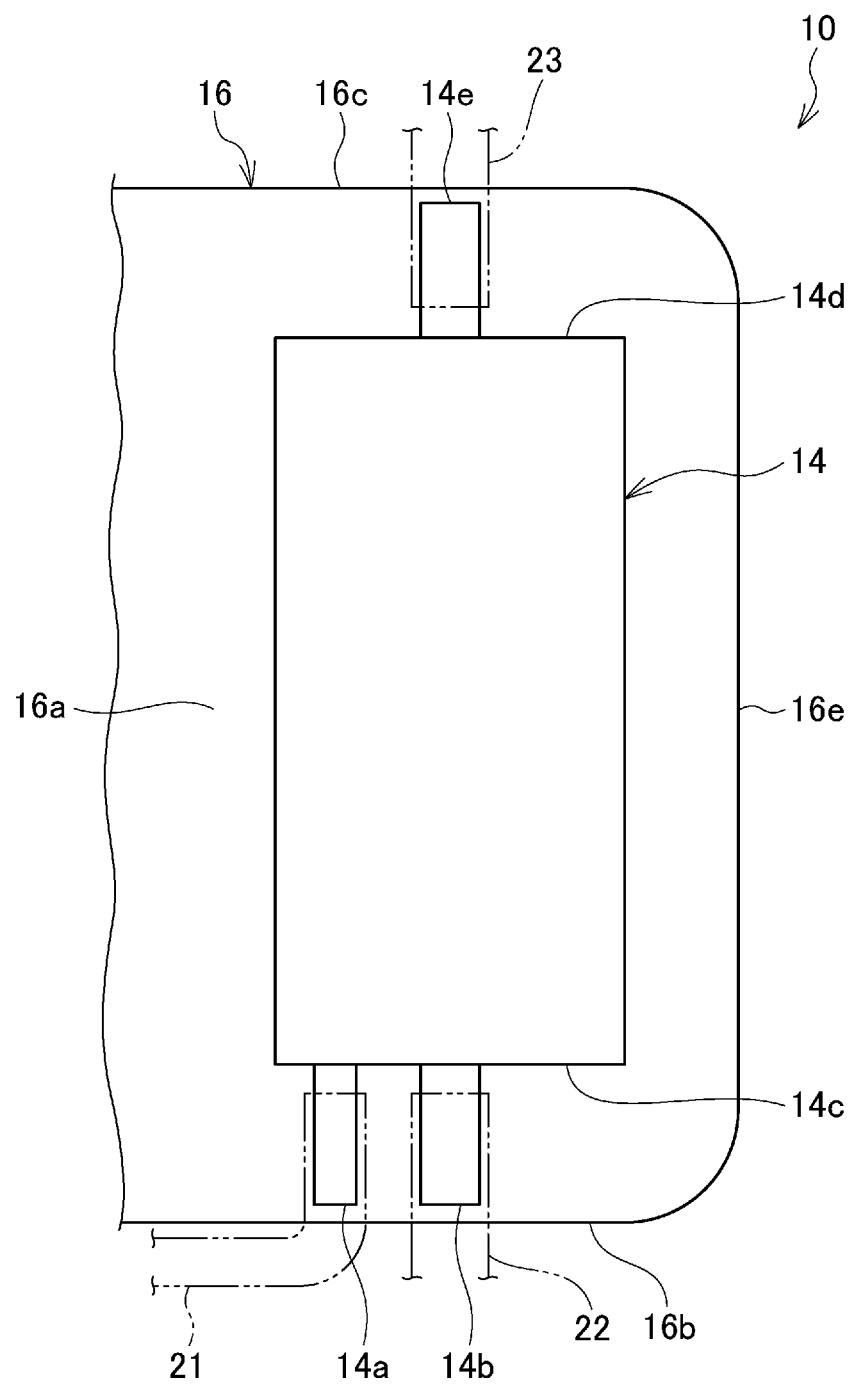
FIG. 2 is a plan view of a main portion of the fuel tank showing a canister.

FIG. 2 is a plan view of a main portion of the fuel tank 10 showing the canister 14.

The canister 14 is formed into a rectangular shape as viewed in a plan view, and the charge port 14a and the purge port 14b protrude from one end surface 14c of the canister 14 in the longitudinal direction, and a fresh air introducing port 14e protrudes from the other end surface 14d in the longitudinal direction.

One end of a fresh air introducing pipe 23 is connected to the fresh air introducing port 14e. The other end of the fresh air introducing pipe 23 is opened to the atmosphere, and fresh air is introduced into the canister 14 through the fresh air introducing pipe 23 and the fresh air introducing port 14e.

Figure 3:
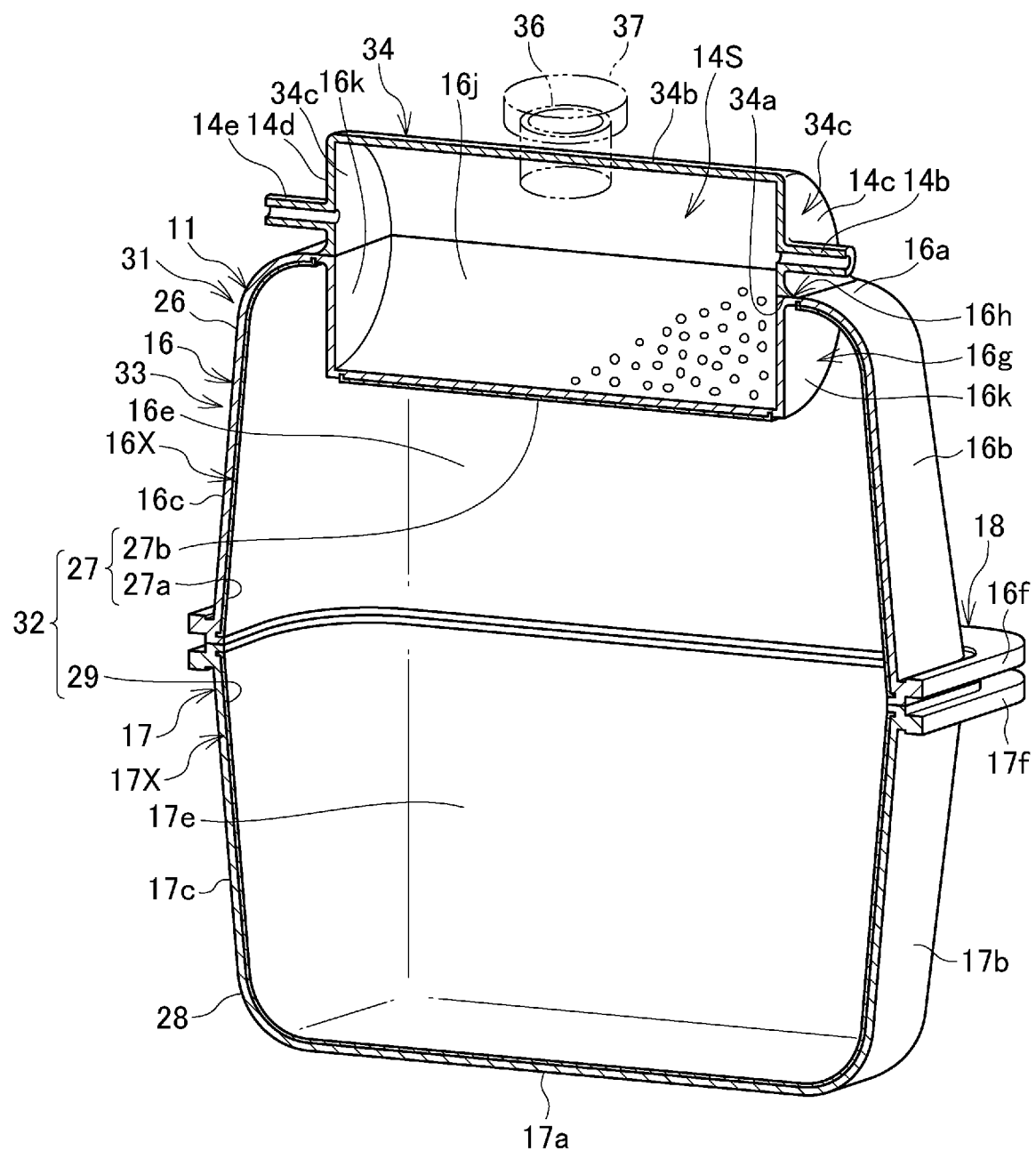
FIG. 3 is a view showing a cross section of the fuel tank taken along a line III-III in FIG. 1 as viewed in an oblique direction.
Figure 4:
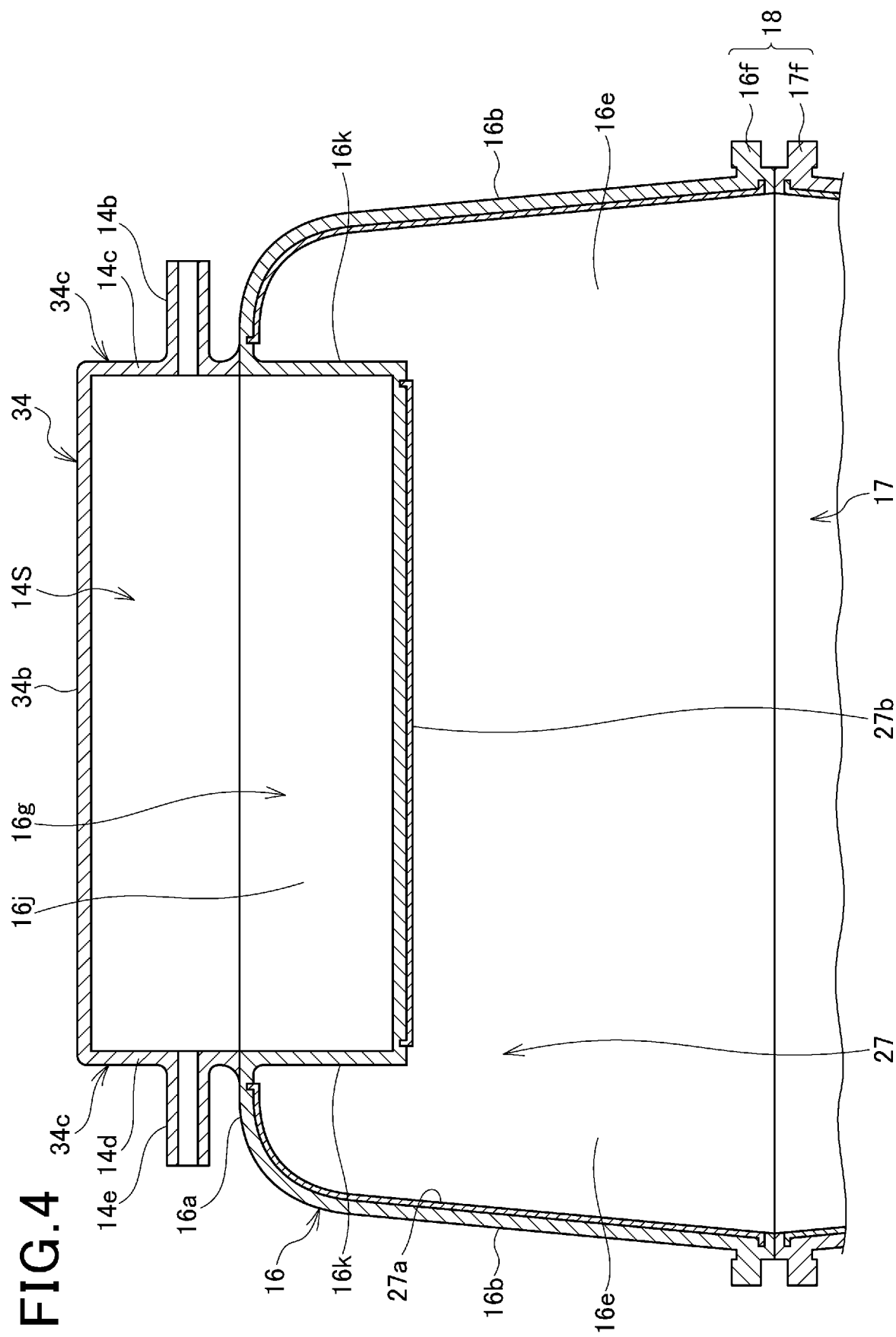
FIG. 4 is a cross-sectional view taken along a line IV-IV in FIG. 1.

FIG. 3 is a view showing a cross section of the fuel tank 10 taken along a line III-III in FIG. 1 as viewed in an oblique direction, and FIG. 4 is a cross-sectional view taken along a line IV-IV in FIG. 1.

As shown in FIG. 3, the upper half body 16 of the tank main portion 11 includes: a resin-made tank body 26; and a barrier layer 27 which is provided on substantially the whole inner surface of the tank body 26. The barrier layer 27 is provided for suppressing permeation of fuel to the outside of the fuel tank 10. The barrier layer 27 is a shaped body which is preliminarily shaped into a tank shape, and is formed substantially along the tank external form. A thickness of the barrier layer 27 is substantially constant over the whole region of the barrier layer 27.

The lower half body 17 of the tank main portion 11 includes: a resin-made tank body 28; and a barrier layer 29 which is provided substantially on the whole inner surface of the tank body 28. A thickness of the barrier layer 29 is substantially constant over the whole region of the barrier layer 29.

The above-mentioned tank bodies 26, 28 form a tank body 31 of the fuel tank 10. The above-mentioned barrier layers 27, 29 form a barrier layer 32 of the fuel tank 10. The above-mentioned tank walls 16X, 17X form a tank wall 33 of the fuel tank 10.

The upper half body 16 is configured such that a semicylindrical recessed portion 16g is integrally formed with the upper wall 16a, and a lower end surface 34a of a semicylindrical lid member 34 is bonded to a peripheral portion 16h of the recessed portion 16g by adhesion or welding.

The recessed portion 16g is integrally formed of: a semicylindrical portion 16j having a semicircular transverse cross section; and a pair of end walls 16k which closes both ends of the semicylindrical portion 16j. The lid member 34 is integrally formed of: a semicylindrical lid portion 34b having a semicircular transverse cross section; and a pair of end walls 34c which closes both ends of the semicylindrical lid portion 34b. The above-mentioned one end surface 14c and the other end surface 14d are provided on the pair of end walls 34c, 34c respectively.

A circular columnar space surrounded by the above-mentioned recessed portion 16g and lid member 34 is formed as an activated carbon storing portion 14S in which activated carbon to be supplied to the canister 14 is stored.

An opening portion 36 for exchanging an adsorbent in the canister 14 may be provided in an upper portion of the lid member 34. The opening portion 36 is closed by a cap 37 detachably mounted on the opening portion 36.

As shown in FIG. 4, the barrier layer 27 of the upper half body 16 is formed of: a first barrier layer 27a which is formed on a portion of the upper wall 16a and the side walls 16b, 16c, 16d, 16e (see FIG. 1 with respect to side wall 16d); and a second barrier layer 27b which is formed on the semicylindrical portion 16j of the recessed portion 16g. In the recessed portion 16g, the barrier layer 27 is not formed on corner portions defined by the semicylindrical portion 16j and the pair of end walls 16k, on the pair of end walls 16k, and on corner portions defined by the upper wall 16a and the pair of end walls 16k. This is because, when the barrier layer 27 is largely bent, a wrinkle is generated in the barrier layer 27 or a concentration of a stress occurs in the barrier layer 27.

The lid member 34 is configured such that the charge port 14a (see FIG. 2) and the purge port 14b are provided on one of the pair of end walls 34c, and the fresh air introducing port 14e is provided on the other of the pair of end walls 34c.

By providing the charge port 14a, the purge port 14b and the fresh air introducing port 14e which are pipe connecting ports on the pair of end walls 34c of the lid member 34 as described above, the charge port 14a, the purge port 14b and the fresh air introducing port 14e are directed sideward. For example, compared to a case where the charge port 14a, the purge port 14b and the fresh air introducing port 14e are provided in an upwardly protruding manner from an upper portion of the lid member 34, in this embodiment, a height of the fuel tank 10 can be suppressed low.

Figure 5:
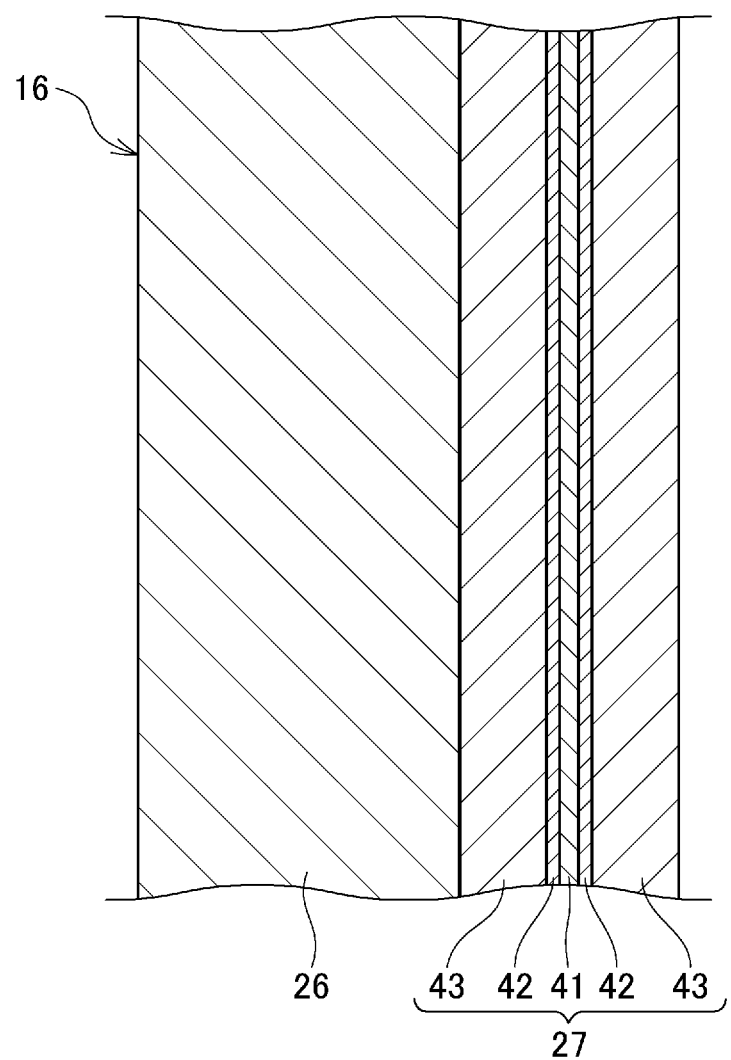
FIG. 5 is a cross-sectional view showing a tank body and a barrier layer of an upper half body.

FIG. 5 is a cross-sectional view showing the tank body 26 and the barrier layer 27 of the upper half body 16.

The upper half body 16 is formed of six layers in total. That is, the tank body 26 is formed of one layer, and the barrier layer 27 is formed of five layers.

The barrier layer 27 includes: a barrier layer body 41; adhesive layers 42, 42 provided on both surfaces of the barrier layer body 41; and outer layers 43, 43 adhered to both sides of the barrier layer body 41 with the adhesive layers 42, 42 interposed therebetween.

As one example of a material for forming the tank body 26, high-density polyethylene (HDPE) can be named.

The barrier layer body 41 is provided for reducing permeation of fuel or the like, and is made of a material which minimally allows permeation of fuel compared to high density polyethylene. As one example, the barrier layer body 41 is made of ethylene vinyl alcohol copolymer (EVOH).

The outer layers 43, 43 are made of the same material as the tank body 26, and are made of high density polyethylene as one example.

The barrier layer 27 is bonded to the inner surface of the tank body 35 with the outer layer 43 on a tank body 26 side interposed therebetween. The barrier layer 27 is bonded to the inner surface of the tank body 26 with the outer layer 43 made of the same material as the tank body 26 interposed therebetween and hence, the barrier layer 27 exhibits high adhesiveness to the tank body 26 and thereby the barrier layer 27 is strongly bonded to the tank body 26.

With respect to the barrier layer 27, the outer layer 43 is exposed to the inside of the tank body 26 and is brought into contact with fuel. Accordingly, it is possible to prevent direct contact of fuel with the barrier layer body 41.

The barrier layer 29 of the lower half body 17 shown in FIG. 3 also has the same structure as the barrier layer 27.

Figure 6:
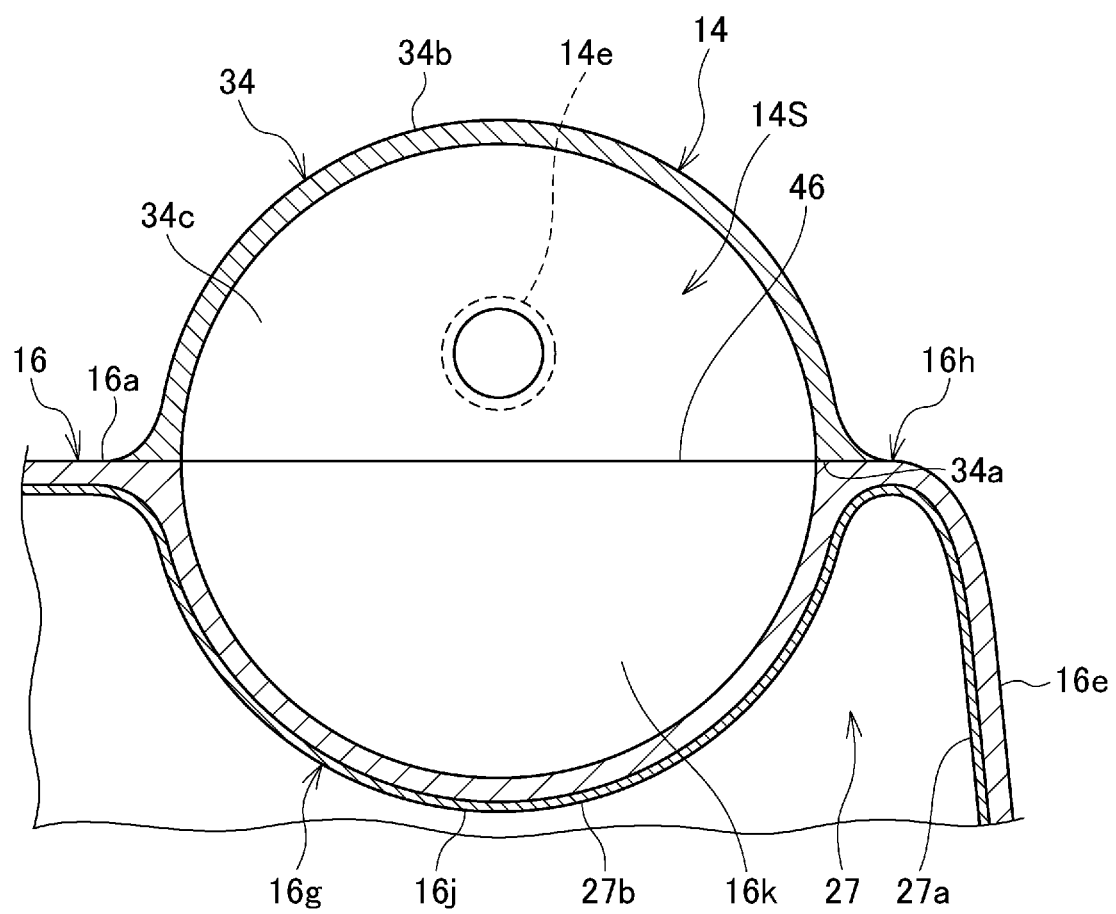
FIG. 6 is a cross-sectional view taken along a line VI-VI in FIG. 1.

FIG. 6 is a cross-sectional view taken along a line VI-VI in FIG. 1.

By bonding the semicylindrical recessed portion 16g and the lid member 34 to each other in a vertical direction, the cylindrical canister 14 (having a circular transverse cross section) is formed.

A rectangular-shaped lower end surface 34a of the lid member 34 is bonded to the peripheral portion 16h of the recessed portion 16g. The whole mating portion 46 between the lower end surface 34a and the peripheral portion 16h is included in one plane.

A barrier layer is not formed between the first barrier layer 27a and the second barrier layer 27b. That is, the barrier layer is not provided in the vicinity of the peripheral portion 16h of the recessed portion 16g.

As shown in the above-mentioned FIG. 1 and FIG. 3, a motorcycle 60 (see FIG. 8) which is a saddle riding vehicle includes the fuel tank 10 made of a resin as a resin-made fuel tank. In the fuel tank 10, the tank wall 33 is formed of: the resin-made tank body 31; and the barrier layer 32 which is formed on the inner surface of the tank body 31 at the time of forming the tank body 31 by injection molding. The barrier layer 32 suppresses permeation of fuel (liquid fuel and evaporated fuel).

The recessed portion 16g which forms the semicylindrical recessed portion indented toward the inward of the tank is integrally formed on the tank wall 33. The activated carbon storing portion 14S of the canister 14 is formed by covering a space which includes the recessed portion 16g with the lid member 34.

With such a configuration, by integrally forming the recessed portion 16g on the tank wall 33, the generation of a wrinkle and the concentration of a stress on the barrier layer 32 in the recessed portion 16g can be prevented; that is, it is possible to so as not to affect the barrier layer 32. Also in this embodiment, the decrease of a capacity of the fuel tank 10 can be suppressed compared to a conventional case where a recessed portion of a fuel tank has a rectangular cross section. Further, in this embodiment, the recessed portion 16g has a semi-cylindrical shape and hence, the fuel tank 10 can be easily formed by injection molding thus enhancing productivity of the fuel tank 10 compared to the conventional case where the recessed portion of the fuel tank has a rectangular cross section.

As shown in FIG. 3, the barrier layer 32 is a shaped body which is preliminarily shaped into a tank shape. The barrier layer 32 is formed substantially along the tank external form. The recessed portion 16g having a semicylindrical shape is formed on a tank body 31 side.

With such a configuration, the recessed portion 16g can be formed in various shapes. For example, a total length of the recessed portion 16g can be changed or a radius of curvature of a semicircular cross section of the recessed portion 16g can be changed.

Figure 7:
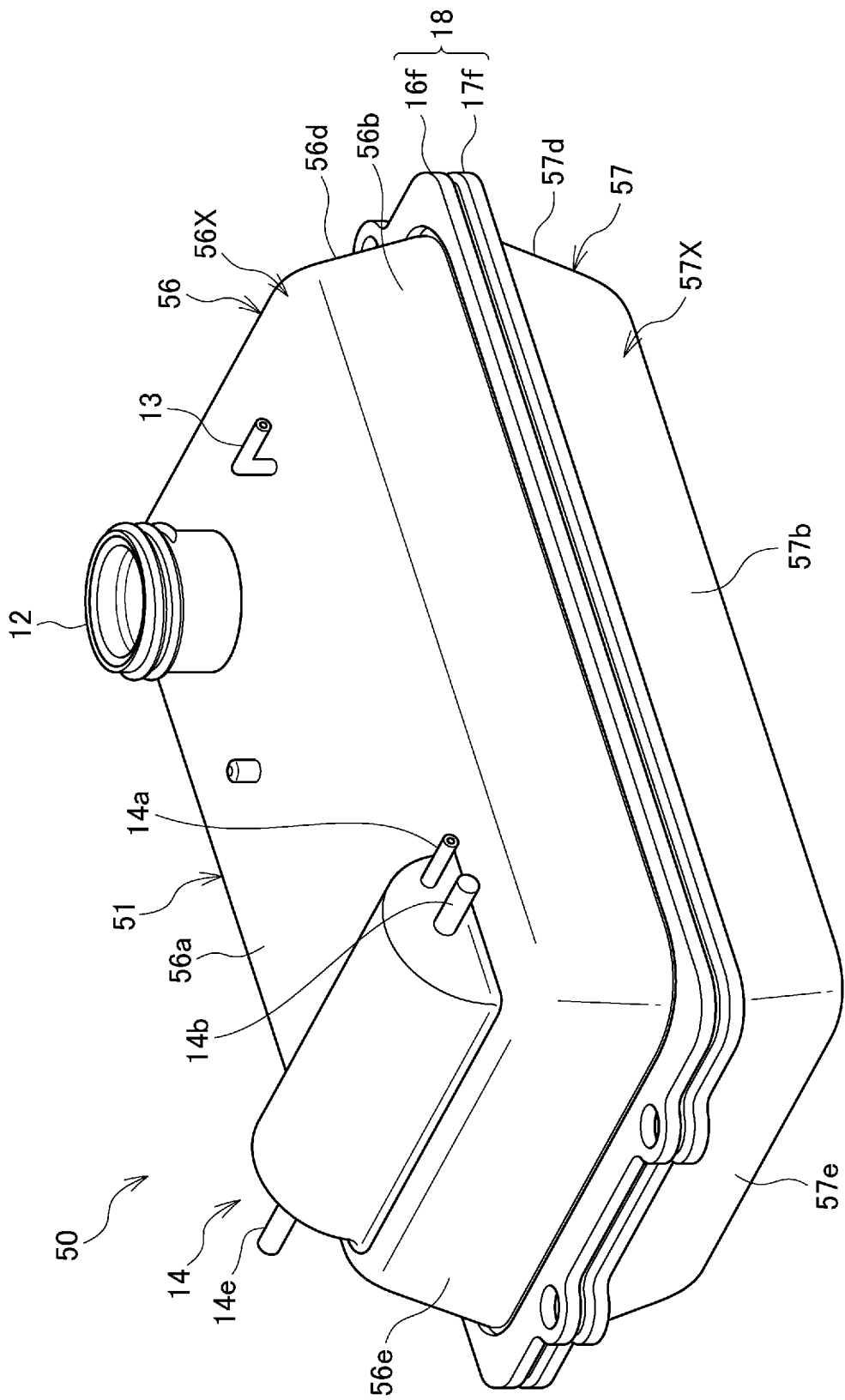
FIG. 7 is a perspective view showing a modification of a shape of the fuel tank shown in FIG. 1.

FIG. 7 is a perspective view showing a modification of the shape of the fuel tank 10 shown in FIG. 1.

A fuel tank 50 includes an upper half body 56 and a lower half body 57 shown in FIG. 7 where both a vertical size of the upper half body 56 and a vertical size of the lower half body 57 are reduced compared to a vertical size of the upper half body 16 and a vertical size of the lower half body 17 of the fuel tank 10 shown in FIG. 1.

That is, the fuel tank 50 includes: a tank main portion 51 which forms a main portion for storing fuel; a filler opening 12 for filling fuel into the tank main portion 51 therethrough; a discharge port 13 for discharging evaporated fuel in the tank main portion 51 to the outside of the tank main portion 51 therethrough; and a canister 14 which is integrally provided on an upper portion of the tank.

The tank main portion 51 is formed of a resin-made upper half body 56 and a resin-made lower half body 57.

The upper half body 56 includes: a tank wall 56X; and an upper flange 16f which is integrally formed on an edge portion of the tank wall 56X.

The tank wall 56X includes an upper wall 56a and four side walls 56b, 56c, 56d, 56e (the side wall 56c (not shown in the drawing) being a wall oppositely facing the side wall 56b).

The lower half body 57 includes a tank wall 57X and a lower flange 17f which is integrally formed on an edge portion of the tank wall 57X.

The tank wall 57X includes a bottom wall (not shown in the drawing), and four side walls 57b, 57c, 57d, 57e (the side wall 57c (not shown in the drawing) being a wall oppositely facing the side wall 57b) which are raised from a peripheral portion of the bottom wall, and both edge portions of the respective four side walls 57b, 57c, 57d, 57e are connected to each other. The lower flange 17f is formed over these side walls 57b, 57c, 57d, 57e.

Figure 8:
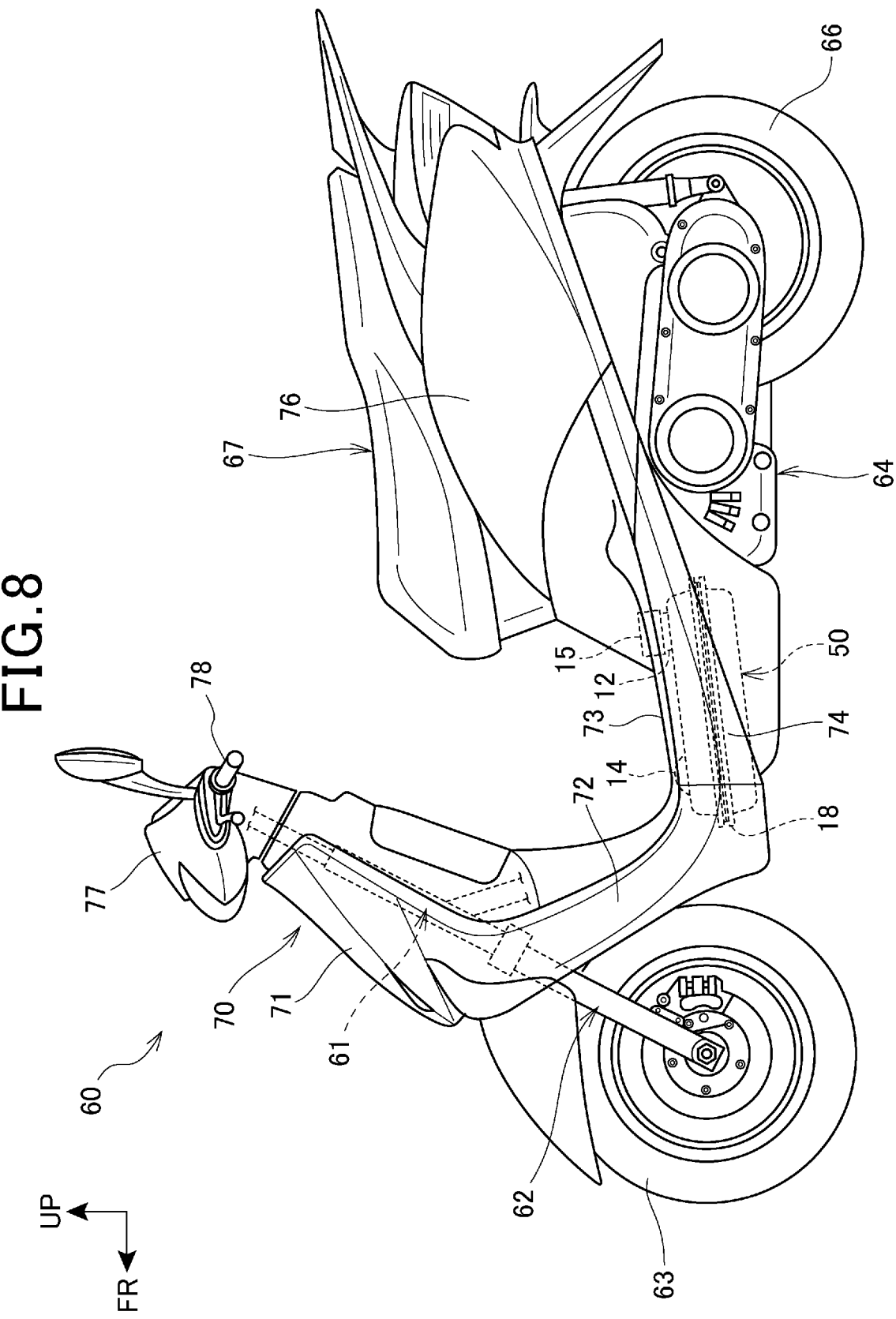
FIG. 8 is a left side view showing a motorcycle on which the fuel tank shown in FIG. 7 is mounted.

FIG. 8 is a left side view showing a motorcycle 60 on which the fuel tank 50 shown in FIG. 7 is mounted.

The motorcycle 60 includes: a vehicle body frame 61; a front wheel 63 which is supported by a front end portion of the vehicle body frame 61 by way of a front fork 62; and a rear wheel 66 which is supported by a lower portion of the vehicle body frame 61 by way of a power unit 64.

The motorcycle 60 is a scooter-type saddle riding vehicle where a rider is seated on a seat 67 disposed above the power unit 64 and the rear wheel 66 in a straddling manner. The motorcycle 60 includes the vehicle body frame 61, and a vehicle body cover 70 which covers the surrounding of the vehicle body frame 61.

The vehicle body cover 70 includes: a front cover 71; a pair of left and right leg shields 72; a pair of left and right floor steps 73; a pair of left and right side skirts 74; a pair of left and right body covers 76; and a handlebar cover 77.

The front cover 71 covers a front side of the front fork 62. The left and right leg shields 72 are connected to both side edges of the front cover 71 thus covering leg portions of a rider seated on the seat 67 from a front side. The left and right floor steps 73 extend rearward from lower end portions of the left and right leg shields 72 thus forming foot placing portions for the rider. The left and right side skirts 74 extend downward from both side edges of the left and right floor steps 73. The left and right body covers 76 cover both side portions of the seat 67 from below. The handlebar cover 77 covers a center portion of a handlebar 78 which is mounted on an upper portion of the front fork 62.

The fuel tank 50 is disposed below the left and right floor steps 73, and the periphery of the fuel tank 50 is covered by the vehicle body cover 70 including the floor steps 73, the side skirts 74 and the like.

The canister 14 is mounted on a front portion of the fuel tank 50, and filler opening 12 (see FIG. 7) and a cap 15 which closes the filler opening 12 are mounted on a rear side of the fuel tank 50. A flange 18 of the fuel tank 50 is mounted on a pair of left and right frame members (not shown in the drawing) which is disposed below the left and right floor steps 73 respectively, or on a plurality of cross frames which extend between the left and right frame members. The pair of left and right frame members and the plurality of cross frames form parts of the vehicle body frame 61.

Second Embodiment

Figure 9:
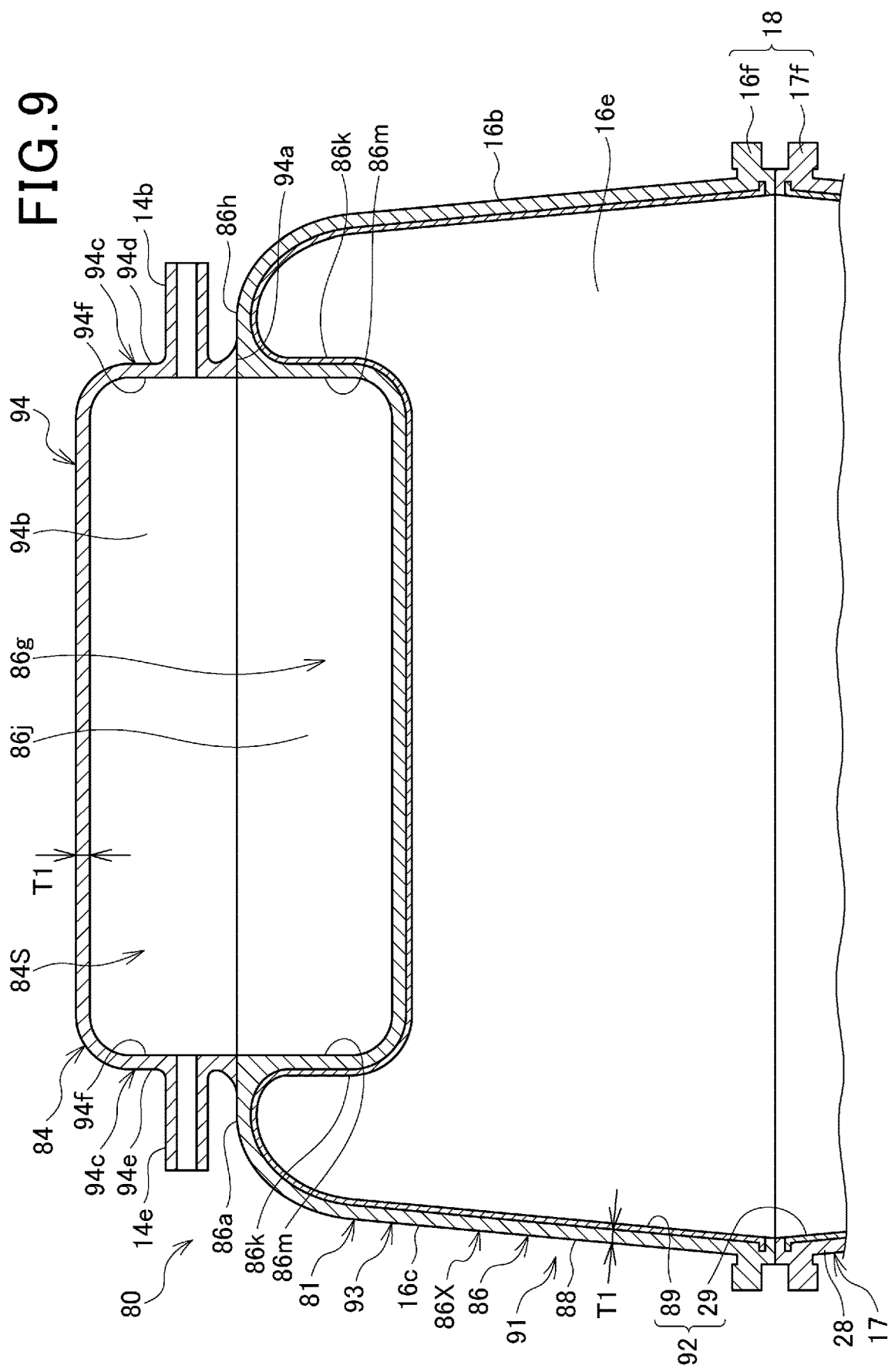
FIG. 9 is a cross-sectional view showing a main portion of a fuel tank according to a second embodiment.

FIG. 9 is a cross-sectional view showing a main portion of a fuel tank 80 according to a second embodiment.

In the second embodiment, parts having the same configuration as the first embodiment are given the same symbols and their detailed description is omitted.

As shown in FIG. 1 and FIG. 9, the fuel tank 80 includes: a tank main portion 81 which forms a main portion for storing fuel; a filler opening 12 for filling fuel into the tank main portion 81 therethrough (see FIG. 1); a discharge port 13 for discharging evaporated fuel in the tank main portion 81 to the outside therethrough (see FIG. 1); and a canister 84 which is integrally provided on an upper portion of the tank.

The tank main portion 81 is formed of a resin-made upper half body 86 and a resin-made lower half body 17.

The upper half body 86 includes a tank wall 86X, and an upper flange 16f which is integrally formed on an edge portion of the tank wall 86X. The tank wall 86X includes an upper wall 86a, and four side walls 16b, 16c, 16d, 16e (see FIG. 1 with respect to the side wall 16d).

The upper half body 86 of the tank main portion 81 includes a resin-made tank body 88, and a barrier layer 89 which is provided on substantially the whole inner surface of the tank body 88. A thickness of the tank body 88 is set to T1. A thickness of the barrier layer 89 is substantially constant over the whole region of the barrier layer 89. In the same manner as the barrier layer 27 shown in FIG. 5, the barrier layer 89 includes a barrier layer body 41, adhesive layers 42, 42, and outer layers 43, 43.

In FIG. 9, the previously-mentioned filler opening 12 (see FIG. 1), the previously-mentioned discharge port 13 (see FIG. 1) and the canister 84 are provided on the upper wall 86a.

The canister 84 is configured such that evaporated fuel in the fuel tank 80 is temporarily adsorbed by an adsorbent (activated carbon), and the adsorbed evaporated fuel is discharged from the activated carbon and is supplied to an intake pipe of an engine of a vehicle (not shown in the drawing) by further taking in fresh air to the canister 84.

The tank bodies 88, 28 form a tank body 91 of the fuel tank 80. The above-mentioned barrier layers 89, 29 form a barrier layer 92 of the fuel tank 80. The above-mentioned tank walls 86X, 17X form a tank wall 93 of the fuel tank 10.

The upper half body 86 is formed such that a semicylindrical recessed portion 86g is integrally formed on an upper wall 86a, and a lower end surface 94a of a lid member 94 is bonded to a peripheral portion 86h of the recessed portion 86g by adhesion or welding.

The recessed portion 86g is an integral part formed of: a semicylindrical portion 86j having a semicircular cross section; and a pair of end walls 86k which closes both ends of the semicylindrical portion 86j.

The lid member 94 is an integral part formed of: a curved lid portion 94b which is curved in an upwardly convex shape, and a pair of end walls 94c which closes both ends of the curved lid portion 94b. A charge port 14a (see FIG. 2) and a purge port 14b are provided on one end surface 94d of the pair of end walls 94c, 94c, and a fresh air introducing port 14e is provided on the other end surface 94d of the pair of end walls 94c, 94c.

A circular columnar space surrounded by the above-mentioned recessed portion 86g and the lid member 94 is formed as an activated carbon storing portion 84S in which activated carbon to be supplied to the canister 84 is stored.

The curved lid portion 94b and the end walls 94c, 94c of the lid member 94 have the same thickness T1 as the tank body 88, and an inner surface 94f of the end wall 94c of the lid member 94 and an inner surface 86m of the end wall 86k of the recessed portion 86g are formed coplanar with each other.

In this manner, by setting the thickness of the end wall 86k of the recessed portion 86g and the thickness of the end wall 94c of the lid member 94 equal to each other and by forming the inner surface 94f of the end wall 94c of the lid member 94 and the inner surface 86m of the end wall 86k of the recessed portion 86g coplanar with each other, a welded portion between the upper half body 86 and the lid member 94 can be disposed away from the barrier layer 89. As a result, at the time of welding the lower end surface 94a of the lid member 94 to the peripheral portion 86h of the recessed portion 86g, it is possible to prevent the barrier layer 89 of the tank body 88 from being affected by heat generated at the time of welding.

As has been described heretofore, the peripheral portion 86h of the recessed portion 86g which forms the semicylindrical recessed portion of the tank wall 93 is connected to the tank wall 93 around the peripheral portion 86h in a curved shape. With such a configuration, by forming the peripheral portion 86h of the recessed portion 86g in a smooth curved shape, the generation of a wrinkle or the concentration of a stress on the barrier layer 92 can be prevented and hence, durability of the barrier layer 92 can be enhanced.

The lid member 94 is formed as a separate part from the tank body 91 and, at the same time, the lid member 94 is bonded to the peripheral portion 86h of the recessed portion 86g. With such a configuration, the barrier layer 92 can be disposed further away from the bonding portion and hence, it is possible to so as not to thermally affect the barrier layer 92 at the time of welding the lid member 94 to the barrier layer 92 and thereby durability of the barrier layer 92 can be enhanced.

The recessed portion 86g includes the barrier layer 92 and hence, it is unnecessary to provide the barrier layer on the lid member 94 and hence, it is possible to suppress leakage of evaporated fuel from the fuel tank 80 while realizing the reduction of a cost.

Further, the lid member 94 protrudes from the tank wall 93 toward the outside of the tank. With such a configuration, it is possible to protrude the canister 84 from the tank wall 93 to the outside of the tank, and thus the decrease of a capacity of the fuel tank 80 can be suppressed. Further, in the case where the lid member 94 is provided on an upper portion of the tank wall 93, it is possible to protrude pipe connecting ports (that is, the charge port 14a (see FIG. 1), the purge port 14b, and the fresh air introducing port 14e) of the canister 84 sideward from the pair of end walls 94c of the lid member 94. With such a configuration, a height of the fuel tank 80 can be suppressed low.

Third Embodiment

Figure 10:
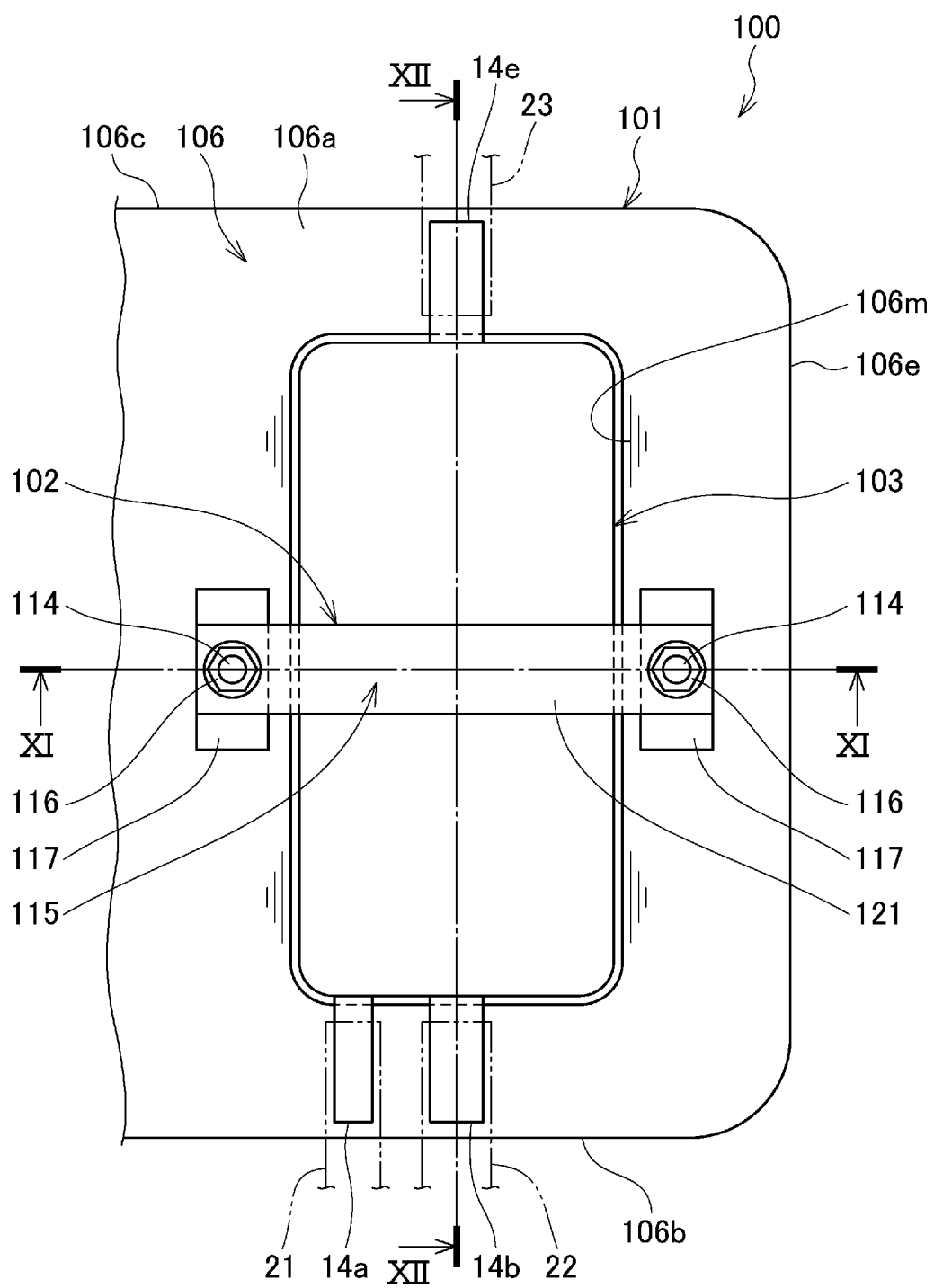
FIG. 10 is a plan view showing a main portion of a fuel tank according to a third embodiment.
Figure 11:
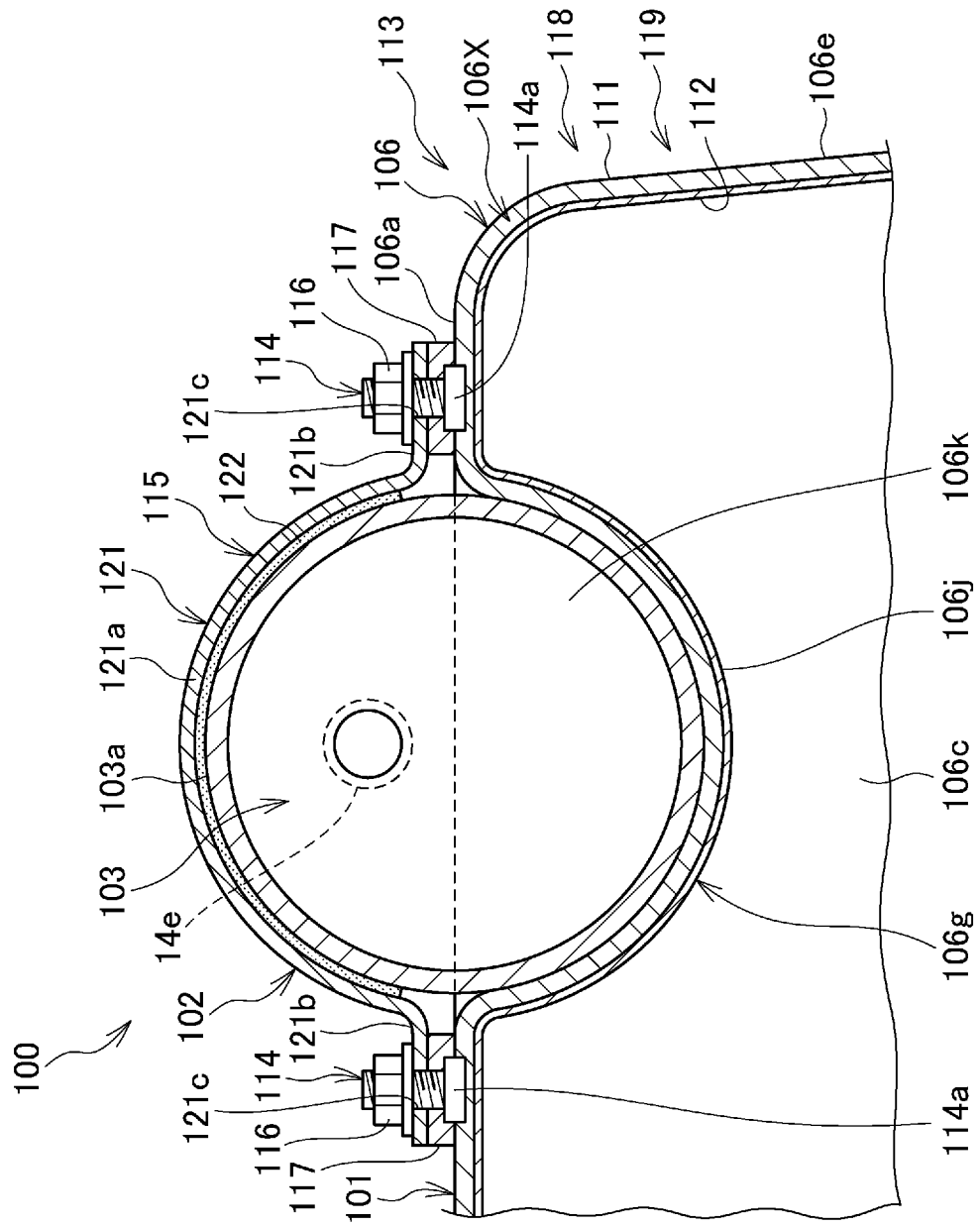
FIG. 11 is a cross-sectional view taken along a line XI-XI in FIG. 10.

FIG. 10 is a plan view of a main portion of a fuel tank 100 according to a third embodiment, and FIG. 11 is a cross-sectional view taken along a line XI-XI in FIG. 10.

In the third embodiment, parts having the same configuration as the first embodiment and the second embodiment are given the same symbols and their detailed description is omitted.

As shown in FIG. 10, the fuel tank 100 includes a canister 103 which is mounted on an upper portion of a tank main portion 101 which forms a main portion for storing fuel using a fixing jig 102.

The canister 103 is configured such that a charge port 14a and a purge port 14b are provided on one end portion of the canister 103, and a fresh air introducing port 14e is provided on the other end portion of the canister 103.

As shown in FIG. 3 and FIG. 11, the tank main portion 101 is formed of a resin-made upper half body 106 and a resin-made lower half body 17.

The upper half body 106 includes a tank wall 106X, and an upper flange 16f which is integrally formed on an edge portion of a tank wall 106X. The tank wall 106X includes an upper wall 106a and four side walls 106b, 106c, 106d, 106e (the side walls 106b, 106d not shown in the drawing, and the side walls 106b, 106d corresponding to the side walls 16b, 16d in FIG. 1).

The upper half body 106 includes a resin-made tank body 111, and a barrier layer 112 which is provided over the substantially whole inner surface of the tank body 111. A thickness of the barrier layer 112 is substantially constant over the whole region of the barrier layer 112.

The above-mentioned tank bodies 111, 28 form a tank body 118 of the fuel tank 100. The above-mentioned barrier layers 112, 29 form a barrier layer 119 of the fuel tank 100. The above-mentioned tank walls 106X, 17X form a tank wall 113 of the fuel tank 100.

A semicylindrical recessed portion 106g is integrally formed on the upper wall 106a of the upper half body 106, and the canister 103 is disposed in the recessed portion 106g.

The recessed portion 106g is an integral part formed of a semicylindrical portion 106j having a semicircular cross section, and a pair of end walls 106k (see FIG. 12) which closes both ends of the semicylindrical portion 106j.

The canister 103 is formed in a cylindrical shape.

As shown in FIG. 10 and FIG. 11, the fixing jig 102 includes a pair of bolts 114, a pressing member 115, a pair of nuts 116, and a molding resin 117.

The pair of bolts 114 is fixed to the tank body 111 of the upper half body 106 at an edge portion of the recessed portion 106g by molding. The pressing member 115 is a part for pressing the canister 103. The pair of nuts 116 fastens the pressing member 115 together with the pair of bolts 114.

To fix the pair of bolts 114 to the tank body 111 by molding, first, a pair of bolts 114 is disposed on the tank body 111 in a die and, then, a molding resin 117 is injected to the peripheries of head portions 114a of the bolts 114 and, finally, the injected resin is cured.

The pressing member 115 is formed of a strip-shaped band member 121, and an elastic member 122 such as rubber which is adhered to a surface of the band member 121 on a canister 103 side.

The band member 121 is formed of: a bent portion 121a which is formed in conformity with an outer surface 103a of the canister 103, and a pair of flat plate portions 121b which extends from both ends of the bent portion 121a. The elastic member 122 is mounted on an inner side of the bent portion 121a. A bolt insertion hole 121c is formed in the respective flat plate portions 121b. The flat plate portions 121b are fastened by the bolts 114 which pass through the bolt insertion holes 121c and the nuts 116. The elastic member 122 holds the canister 103 with elasticity.

Figure 12:
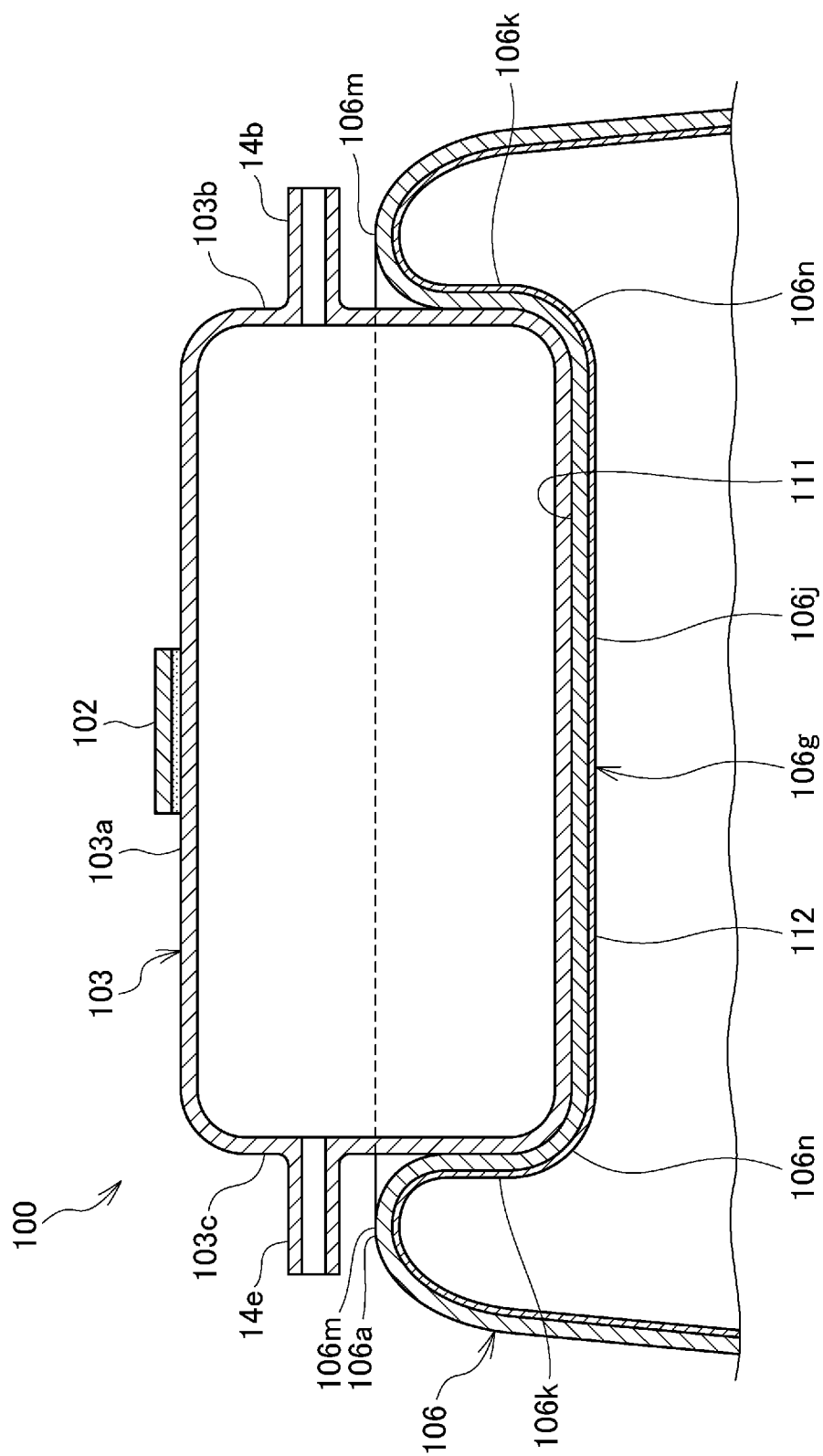
FIG. 12 is a cross-sectional view taken along a line XII-XII in FIG. 10.

FIG. 12 is a cross-sectional view taken along a line XII-XII in FIG. 10.

A charge port 14a (see FIG. 1) and a purge port 14b are provided on one end surface 103b of the canister 103, and a fresh air introducing port 14e is provided on the other end portion 103c of the canister 103.

The barrier layer 112 is formed on respective peripheral portions 106m of the recessed portion 106g of the upper half body 106 in a smooth curved shape. At corner portions 106n defined by the semicylindrical portion 106j of the recessed portion 106g and the pair of end walls 106k, the tank body 111 and the barrier layer 112 are formed in a smooth curved shape.

By forming the peripheral portions 106m and the corner portions 106n as described above, radii of curvature of the bent portions of the barrier layer 112 of the upper half body 106 are increased and hence, it is possible to prevent the generation of a wrinkle on the barrier layer 112 and the concentration of a stress on the barrier layer 112. With such a configuration, the barrier layer 112 can be formed continuously over the whole region ranging from the upper wall 106a to the recessed portion 106g of the upper half body 106 and hence, permeation of evaporated fuel in the fuel tank 100 can be further suppressed.

As shown in FIG. 10 to FIG. 12, the motorcycle 60 which forms the saddle riding vehicle (see FIG. 8) includes the fuel tank 100 as a resin-made fuel tank. In the fuel tank 100, the tank wall 113 is formed of a resin-made tank body 118, and a barrier layer 119 which is formed on an inner surface of the tank body 118 at the time of forming the tank body 118 by injection molding for suppressing permeation of fuel (liquid fuel and evaporated fuel).

The recessed portion 106g which forms a semicylindrical recessed portion indented to the inside of the tank is integrally formed on the tank wall 113. The canister 103 which is formed as a separate part is detachably disposed in the recessed portion 106g, and the canister 103 which forms a separate part is held on an outer surface of the tank body 118 by the fixing jig 102 which forms a holding unit.

With such a configuration, the canister 103 which forms a separate part can be mounted on the tank body 118 from the outside and hence, the canister 103 can be detachably mounted and hence, maintenance property can be enhanced.

The embodiments described heretofore are merely provided for exemplifying one mode of the present invention, and modifications and applications of the embodiments are conceivable as desired without departing from the gist of the present invention.

In the above-mentioned embodiments, the recessed portion 16g which forms a semicircular recessed portion having a semicircular transverse cross section is integrally formed with the tank wall 33 as shown in FIG. 3, and the recessed portion 86g which forms a semicircular recessed portion having a semicircular transverse cross section is integrally formed with the tank wall 93 as shown in FIG. 9. However, the present invention is not limited to such configurations. For example, a recessed portion having a semielliptical transverse cross section, a semi-elongated-circular transverse cross section, a semi-polygonal transverse cross section with round corner portions, any one of transverse cross sections similar to these transverse cross sections, or any one of semi transverse cross sections other than the above-mentioned transverse cross sections may be integrally formed with the tank wall 33, 93. The semi transverse cross section is obtained by splitting a closed shape in two. The above-mentioned recessed portions including the semicircular recessed portion may be respectively formed of a recessed portion having an opening portion formed by forming an opening which opens from the recessed portion to an outside of the tank (that is, a groove-like recessed portion where at least one end portion of the recessed portion is opened). In this case, the lid member covers the space which includes the recessed portion such that the lid member also covers the opening portion formed in the side wall surface.

Further, as shown in FIG. 1, the canister 14 is provided on the upper wall 16a of the fuel tank 10. However, the present invention is not limited to such a configuration, and the canister 14 may be provided on a side wall or on a bottom wall.

As shown in FIG. 8, the fuel tank 50 on which the canister 14 is integrally provided is mounted on the scooter-type motorcycle 60 (the fuel tank 10, 80, 100 also mountable on the motorcycle 60). However, the present invention is not limited to such a configuration. The fuel tank 50 is also applicable to saddle riding vehicles including vehicles other than the motorcycle 60. The saddle riding vehicle includes all vehicles of a type where a rider rides on a vehicle body in a straddling manner, and includes not only motorcycles (including motor-assisted bicycles) but also three-wheeled vehicles and four-wheeled vehicle which are categorized into an all-terrain vehicles (ATV).

Further, the position of the canister 14 in the fuel tank 10 (see FIG. 1), 50 is not limited to the positions described in the above-mentioned respective embodiments.

The application of fuel tank 10, 50, 80, 100 is not limited to the vehicles, and the fuel tanks 10, 50, 80, 100 may be mounted on or installed in industrial machines or facilities respectively provided with an engine.

REFERENCE SIGNS LIST 10, 50, 80, 100: fuel tank
14, 84, 103: canister
14S: activated carbon storing portion
16g, 86g: recessed portion
16h, 86h: peripheral portion
31, 91, 111, 118: tank body
32, 92, 112, 119: barrier layer
33, 93, 113: tank wall
34, 94: lid member
50: fuel tank
60: motorcycle (saddle riding vehicle)
84S: activated carbon storing portion
100: fuel tank
102: fixing jig (holding unit)
106g: recessed portion (semicylindrical recessed portion)

The invention claimed is:

1. A resin-made fuel tank of a saddle riding vehicle where a tank wall is formed of: a resin-made tank body; and a barrier layer formed on an inner surface of the tank body at the time of forming the tank body by injection molding, the barrier layer being provided for suppressing permeation of fuel,
wherein a recessed portion indented toward the inward of the tank is integrally formed with the tank wall, and an adsorbent storing portion of a canister is formed by covering a space which includes the recessed portion with a lid member, and
wherein the lid member is formed as a separate part from the tank body, and the lid member is bonded to the peripheral portion of the recessed portion.

2. The resin-made fuel tank of a saddle riding vehicle according to claim 1,
wherein the barrier layer is a shaped body which is preliminarily shaped into a tank shape, the barrier layer is formed substantially along the tank external form, and the recessed portion is formed on a side of the tank body.

3. The resin-made fuel tank of a saddle riding vehicle according to claim 2,
wherein a peripheral portion of the recessed portion of the tank wall is connected to the tank wall around the peripheral portion in a curved shape.

4. The resin-made fuel tank of a saddle riding vehicle according to claim 2,
wherein the recessed portion includes the barrier layer.

5. The resin-made fuel tank of a saddle riding vehicle according to claim 2,
wherein the lid member protrudes from the tank wall toward an outside of the tank.

6. The resin-made fuel tank of a saddle riding vehicle according to claim 1,
wherein a peripheral portion of the recessed portion of the tank wall is connected to the tank wall around the peripheral portion in a curved shape.

7. The resin-made fuel tank of a saddle riding vehicle according to claim 6,
wherein the recessed portion includes the barrier layer.

8. The resin-made fuel tank of a saddle riding vehicle according to claim 6,
wherein the lid member protrudes from the tank wall toward an outside of the tank.

9. The resin-made fuel tank of a saddle riding vehicle according to claim 1,
wherein the recessed portion includes the barrier layer.

10. The resin-made fuel tank of a saddle riding vehicle according to claim 9,
wherein the lid member protrudes from the tank wall toward an outside of the tank.

11. The resin-made fuel tank of a saddle riding vehicle according to claim 1,
wherein the lid member protrudes from the tank wall toward an outside of the tank.

12. The resin-made fuel tank of a saddle riding vehicle according to claim 1,
wherein the lid member bulges toward an outside of the tank, the adsorbent storing portion of the canister is formed by a space inside the recessed portion and a space inside the lid member,
the barrier layer includes a barrier layer body and outer layers adhered to both sides of the barrier layer body,
the barrier layer outer layers and the tank body are made of a same material,
end walls, which are formed at both ends of the lid member, are provided on the tank wall at the outside of the tank, and
all charge ports of the canister are provided on the end walls.

13. The resin-made fuel tank of a saddle riding vehicle according to claim 12,
wherein the tank body and the barrier layer outer layers are formed from high-density polyethylene (HDPE), and
the barrier layer body is formed from ethylene vinyl alcohol copolymer (EVOH).

14. The resin-made fuel tank of a saddle riding vehicle according to claim 12,
wherein the barrier layer body is adhered to the barrier layer outer layers with adhesive layers interposed therebetween.

15. The resin-made fuel tank of a saddle riding vehicle according to claim 1,
wherein the lid member is configured such that a charge port, a purge port, and a fresh air introducing port, which are charge ports of the canister, are provided at an end portion of the lid member, when viewed in a longitudinal direction,
end walls, which are formed at both ends of the lid member, are provided on the tank wall at an outside of the tank, and
all the charge ports of the canister are provided on the end walls.

* * * * *